May 16, 1950
H. H. NELSON
2,507,610
CORD LOCK FOR BLINDS
Filed June 3, 1944
2 Sheets-Sheet 1
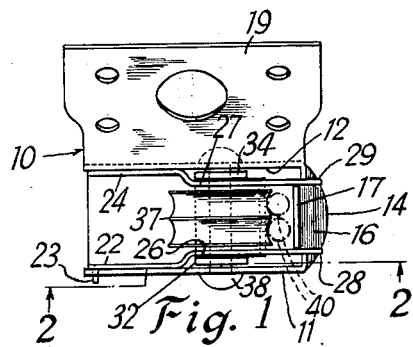
Fig. 1
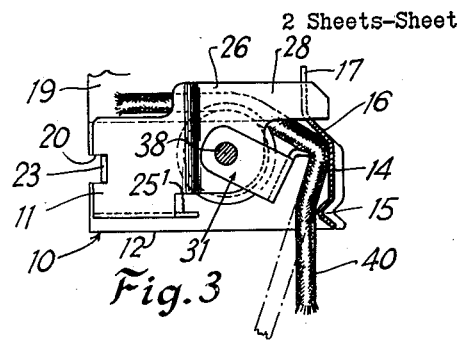
Fig. 3
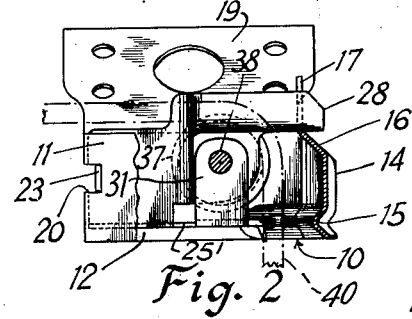
Fig. 2
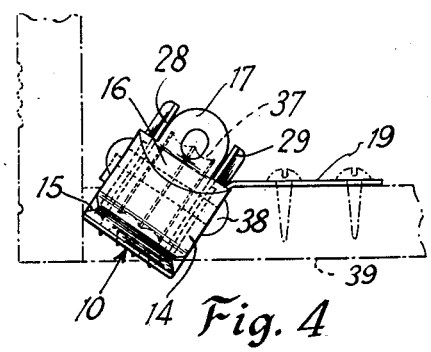
Fig. 4
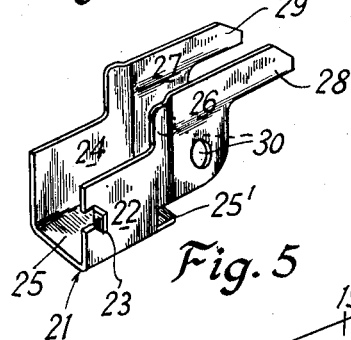
Fig. 5
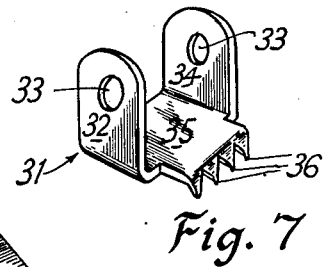
Fig. 7
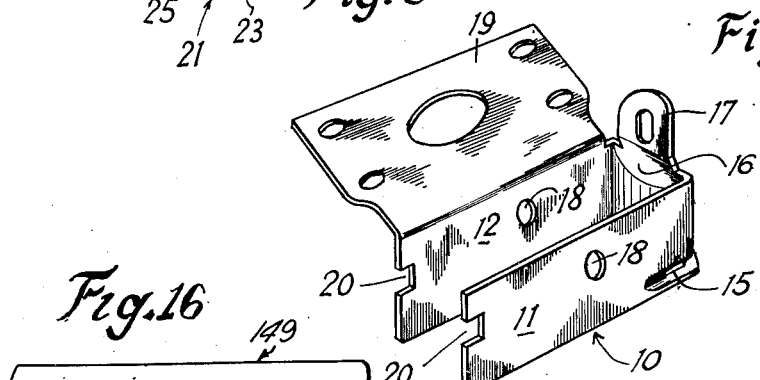
Fig. 16
Fig. 6
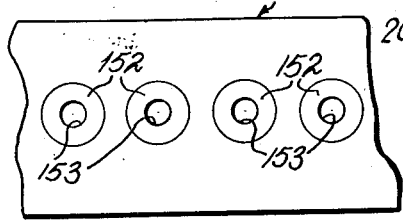
INVENTOR.
Harry H. Nelson
BY
Ramsey, Kent & Chisholm
ATTORNEYS

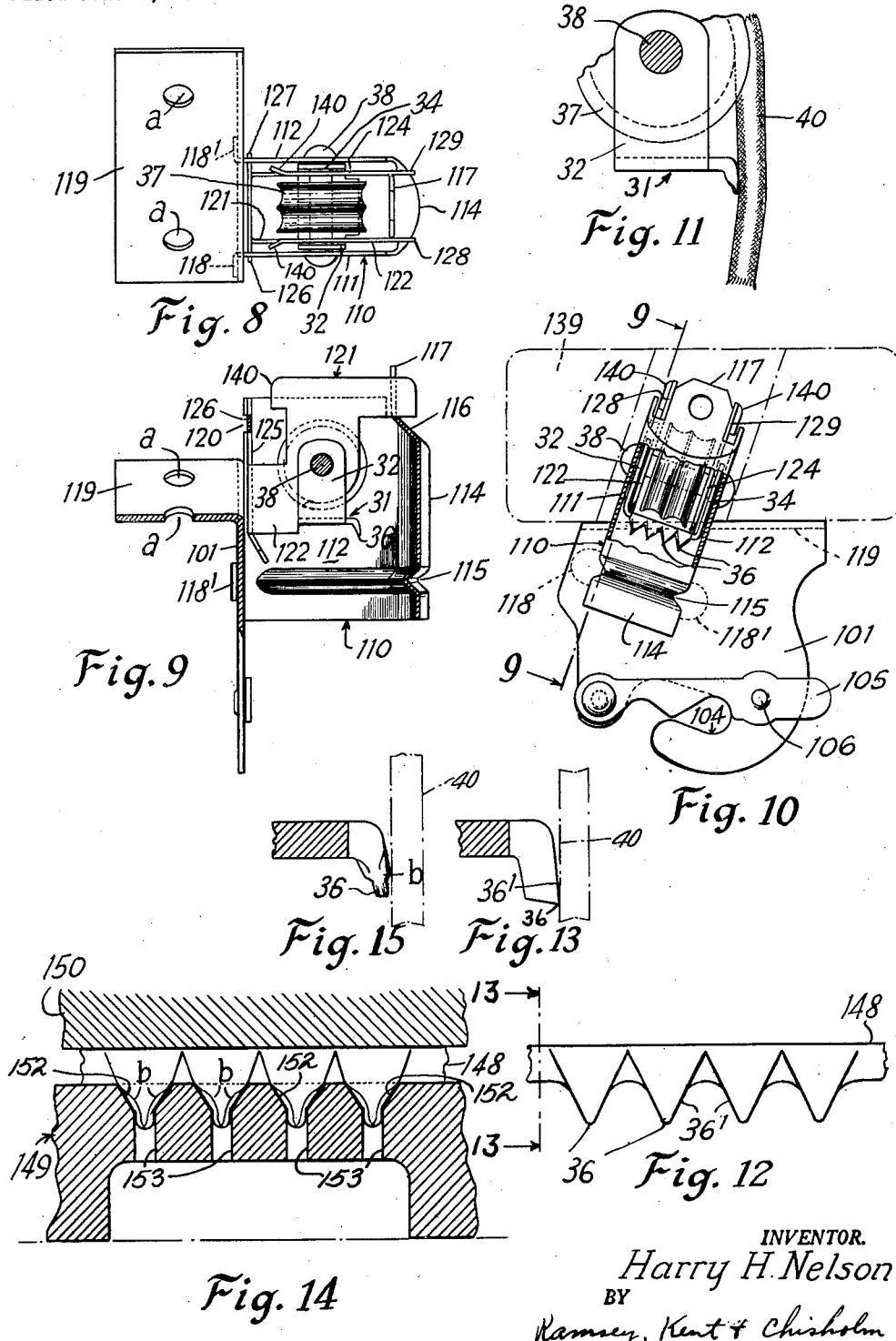

Patented May 16, 1950

2,507,610

UNITED STATES PATENT OFFICE 2,507,610

CORD LOCK FOR BLINDS

Harry H. Nelson, New York, N. Y., assignor to Lorentzen Hardware Mfg. Corp., New York, N. Y., a corporation of New York Application June 3, 1944, Serial No. 538,601

17 Claims. (Cl. 24—134)

This invention relates to cord locks of the general type used in Venetian blinds.

An object of the present invention is to provide a cord lock having a cord pulley and a one-piece locking member rotatable about the same axis.

Another object of the invention is to provide means for separating the pulley from the locking member to prevent contact therebetween.

Another object of the invention is to provide cord lock mechanism in which a pulley, locking member and partition member are retained in a housing by a single rivet or the like about which the pulley and locking member can rotate.

Another object of the invention is to provide a partition member having walls interposed between expanses of a locking dog or cam and the side walls of a pulley rotatable about the same shaft as the dog, such partition member also being so shaped as to serve as a stop for the dog limiting movement thereof in one direction.

A further object of the invention is to provide formations on cord lock housing and the partition member, aforementioned, which cooperate to maintain the spaced walls of the partition member in such relation as to prevent binding engagement of these walls with the side walls of a pulley rotatably mounted therebetween, and/or to prevent binding engagement of the partition walls with portions of the locking dog.

A further object of the invention is to provide a cord lock dog having cord engaging formations of generally saw tooth shape modified to reduce destructive wear on a cord.

A still further object of the invention is to provide a cord lock dog having a generally saw tooth edge with the ends of the teeth partially rounded to substantially eliminate destructive wear on a cord, with the cord gripping properties of the teeth being as great or even increased.

In carrying out the foregoing and other objects of the invention use is made, in one embodiment, of a housing member having parallel side walls joined by a curved end wall, with one of the side walls having an angular extension utilized in attaching the housing to a head bar or other support. Within the housing is a partition member comprising parallel side walls joined by a bottom, with the side walls closely fitting the side walls of the housing. The side walls of the partition member have offset portions spaced from the side walls of the housing to provide spaces for the legs of a cord lock dog or cam. Fingers on the offset portions engage a tongue extending upwardly from the rounded end wall of the housing to prevent constriction of the space between the offset portions in which space is positioned a pulley. A single rivet passes through the side walls of the housing, the legs of the dog, the offset portions, and the pulley, such rivet serving as a common shaft about which the pulley and the dog rotate; and in addition this rivet holds all these parts in assembly.

In another embodiment the ends of parallel side walls of a housing are secured to a plate which has an angular extension used in securing the device to a head bar or other support, and which has a depending portion slotted to receive a gudgeon pin on the end of a tilt bar. The other ends of these side walls are joined by an integral curved end wall, and parts analogous to those previously described are held in assembly within the housing.

In each embodiment use is made of a cord lock dog or cam, having parallel legs joined by a flat bar, from one edge of which an integral saw tooth formation extends downwardly. The ends of these teeth, instead of being of conventional saw tooth form, with consequent destructive wear on a cord, are partially rounded in such manner as to greatly reduce destructive action on the cord. Suitable die mechanism can be used for imparting this shape to the teeth.

Further objects, and objects relating to details and economies of construction and use will more definitely appear from the detailed description to follow.

My invention is defined in the appended claims. In the claims, as well as in the description, parts are at times identified by specific names for convenience, but such nomenclature is intended to be as generic, in its application to analogous parts, as the prior art will permit. The best forms in which I have contemplated applying my invention are illustrated in the accompanying drawings, forming a part of this application, in which:

Fig. 1 is a plan view of a first embodiment of the invention, cords being indicated in dot-dash lines, Fig. 2 is a view substantially on the line 2—2 of Fig. 1 showing the locking dog in unlocked position, a cord being indicated in dot-dash lines, Fig. 3 is a view similar to Fig. 2, showing the cord locked, Fig. 4 is an end view of the device and showing how it is attached to a head bar or other support, Fig. 5 is a perspective view of the partition member used in this embodiment, Fig. 6 is a perspective view of the housing thereof, Fig. 7 is a perspective view of the cord lock dog or cam, Fig. 8 is a plan view of a second embodiment of the invention, Fig. 9 is a section taken substantially on the line 9—9 of Fig. 10, Fig. 10 is an end view of the second embodiment and showing how it is attached to a head bar, Fig. 11 is an enlarged detail view of the pulley and dog, showing the engagement of a cord with the teeth of the dog or cam, Fig. 12 is a fragmentary edge view of a strip on which saw teeth have been stamped preparatory to forming a locking dog, Fig. 13 is a fragmentary view taken substantially on the line 13—13 of Fig. 12, a cord being indicated in dot-dash lines, Fig. 14 is a fragmentary sectional view through die mechanism showing the saw tooth formations being partially rounded, Fig. 15 is a view similar to Fig. 13, showing a tooth partially rounded, a cord being indicated in dot-dash lines, and Fig. 16 (sheet 1) is a fragmentary plan view of the die shown in Fig. 14.

Referring now to the drawings and particularly to Figs. 1–7 inclusive, 10 indicates a cord lock housing made up of parallel side walls 11 and 12 joined by an integral rounded end wall 14. Housing 10 is provided with an inwardly directed rib 15, extending completely around the end wall 14 and a short distance into the side walls 11 and 12. The top portion of end wall 14 is flattened inwardly at 16 to provide a locking surface, and a tongue 17 extends upwardly from surface 16. Walls 11 and 12 are provided with aligned apertures 18, 18. Wall 12 has an integral flange 19 extending outwardly and upwardly from its top. Flange 19 is suitably apertured for the passage of screws or the like for mounting the device on a support, as shown in Fig. 4. The ends of walls 11 and 12 are notched at 20, 20 for a purpose to be explained later.

Adapted to be retained in housing 10 is a partition member 21 (Fig. 5) which has parallel side walls 22 and 24 joined by a flat bottom 25. One wall (either 22 or 24) is provided with a punched-out tongue 23. Offset portions 26 and 27 are formed integral with walls 22 and 24 respectively, the offset portions being parallel and having the planes of their outer surfaces spaced inwardly from the planes of the outer surfaces of walls 22 and 24. The lower edges of offset portions 26 and 27 are spaced from the top surface of bottom 25. Offset portions 26 and 27 have aligned holes 30, 30 and finger extensions 28 and 29, respectively.

Also adapted to be retained in housing 10 is a cord lock dog or cam 31 (Fig. 7) made up of parallel legs 32 and 34 joined by an integral bar 35, one edge of which is extended and shaped to have depending teeth 36. Aligned apertures 33, 33 are provided in legs 32 and 34.

All of the parts 10, 21 and 31 are stamped from sheet metal of suitable character. These parts together with a double-grooved pulley 37 (which may be of metal or wood) are assembled in the following manner: Partition member 21 is inserted in housing 10 with tongue 23 fitting in one of the notches 20, 20 with fingers 28 and 29 resting on the top of end wall 14 and engaging the opposite vertical edges of tongue 17, and with apertures 30, 30 in alignment with apertures 18, 18. Dog 31 is inserted in the housing with leg 32 positioned in the space between wall 11 and offset portion 26, and with leg 34 in the space between wall 12 and offset portion 27, apertures 33, 33 being in alignment with apertures 18, 18 and 30, 30. Pulley 37 is then inserted between portions 26 and 27 with the through aperture thereof in alignment with all of the apertures 18, 30 and 33. When these parts have been so aligned a rivet 38 is passed through the aligned apertures and set to hold all of the parts in permanent assembly.

The device can be attached to a head bar 39 or other support (Fig. 4) by screws passing through attaching flange 19, the head bar being suitably apertured or recessed to receive housing 10. In use, elevator cord expanses 40, 40 pass upwardly through the housing between end wall 14 thereof and the toothed edge of dog 31 and over pulley 37. When so mounted the cord lock is used in substantially conventional manner, i. e. a straight downward pull on cord expanses 40, 40 to elevate the blind, releases the dog from cord locking position (Fig. 3). Once the dog has been released it drops by gravity to the Fig. 2 position and will remain in this position until the cord is allowed to rise slightly after being moved to the left sufficiently for teeth 36 to grip the cord, whereupon the cord moves the dog to locking position. In locking position (Fig. 3) the dog forces the cord against both end wall 14 and locking surface 16. As long as the cord is kept out of substantial contact with the dog teeth while the dog is in the Fig. 2 position, the cord can ascend permitting lowering of the blind. The angularity of attaching flange 19 relative to the housing is determined to position the housing and contained parts at such angularity as to allow the cord expanses to run freely when the person manipulating the cords is standing in the usual position relative to the blind.

The device just described possesses features and advantages over prior devices of similar nature. Since the dog 31 and pulley 37 rotate about the same axis, (that defined by the common shaft or rivet 38) the pulley 37 can be of larger diameter for a given height of housing than would be possible if the pulley and dog were on separate spaced shafts. Increase in pulley diameter enhances smooth efficient operation of the blind. Consequently the housing can be made of such height (determined by the distance from top to bottom of side walls 22 and 24) as to be readily usable with thin head bars without reducing the pulley diameter with attendant sacrifice in smoothness and efficiency of operation. The positive barriers afforded by offset portions 26 and 27 between the sides of pulley 37 and legs 32 and 34 of the dog prevent any possible contact between the pulley and these legs, which contact would be of frictional nature, and under certain conditions could cause the pulley, in rotating, to lift the dog, thereby locking the cord prematurely during lowering of the blind. Tongue 17 on the housing, engaged by fingers 28 and 29, serves as a spacer holding offset portions 26 and 27 apart so that they cannot so approach each other as to bind the pulley against rotation. Space for free rotation of the pulley is thus safeguarded. The end 25' of bottom 25 of partition member 21 serves as a stop for dog 31 (Fig. 2), thereby preventing the dog from rotating downwardly to too low a position. A notch 20 is provided in each of the legs 11 and 12 to selectively receive the tongue 23, thereby facilitating the manufacture and assembly of right and left hand cord locks with a minimum of different parts and a minimum of different stamping dies to form the same. Rib 15 near the bottom of the housing serves to guide the cord expanses centrally relative to the housing and the pulley, and since the inner surface of the rib is rounded, fraying of the cord against a sharp surface is obviated.

The features set forth above may also be incorporated in a cord lock device in which the housing thereof is secured to a tilt bar bracket as illustrated in the embodiment of Figs. 8–10 inclusive. In this embodiment 110 indicates generally a housing having parallel side walls 111 and 112 joined by an integral rounded end wall 114. Use is made of the bead 115, locking surface 116 and upwardly extending tongue 117. Walls 111 and 112 have fingers 118 and 118' which pass through slots in a plate 101 and are bent against one surface thereof to lock the housing to the plate. Plate 101 has a right angle flange 119 apertured at $a$, $a$ for the passage of attaching screws or the like. Walls 111 and 112 each have notches 120 corresponding to notches 20 of Fig. 6.

The partition member 121 comprises parallel side walls 122 and 124 joined by a vertical wall 125 which extends upwardly beyond the region of its connection to side walls 122 and 124, the extension having outwardly directed tongues 126 and 127 engaging notches 120, 120 of the housing. Since partition walls 122 and 124 are spaced from housing walls 111 and 112 throughout their expanse, offset portions corresponding to 26 and 27 (Fig. 5) are not necessary. Fingers 128 and 129 engage the opposite edges of tongue 117 to maintain the space between partition walls 122 and 124. Undesired movement of the partition member toward either wall 111 or 112 is limited by outstruck ears 140, 140.

A dog 31 made as previously described is used in this embodiment with legs 32 and 34 positioned respectively between walls 111 and 122 and between walls 112 and 124. A pulley 37 is also used, being located between walls 122 and 124, and being held in assembly in the housing along with parts 121 and 31 by rivet 38 which passes through aligned openings in the manner previously described, and which provides a common shaft about which the pulley and dog may rotate.

The lower portion of plate 101 is recessed to provide a rest 104 for a gudgeon pin or the like in the end of a tilt bar. Such a pin can be held in place by a latch 105, pivotally secured to plate 101 and having a depression 106 therein which can engage a similar depression in plate 101 to hold the latch in pin-locking position.

This device can be attached to a head bar 139 (Fig. 10) or other support with part of housing 110 extending into an opening or slot in the head bar and part thereof extending below the head bar. Attachment of the device to the bar can be accomplished by screws passing through holes $a$, $a$ in flange 119 which rests against the bottom surface of bar 139.

Elevator cords are used in this embodiment in the manner previously described and the advantages set forth are again present.

In the cord lock dog used in each embodiment the teeth have been modified to minimize destructive wear or fraying of the elevator cord due to the sharp edges on the teeth. Referring to Fig. 11 it will be seen that when the cord 40 is pulled downwardly, it may bear against teeth 36. If these teeth are of conventional saw tooth construction as shown on the strip 148 in Fig. 12, it is evident that in addition to the points of the teeth, sharp edges 36' extend upwardly from the points and these edges, as well as points 36, rapidly fray the cord. To reduce this fraying action, the metal strip 148 is placed in a die 149 (Figs. 14 and 16) having tapered holes 152 which merge with cylindrical holes 153. The saw teeth are forced into the holes by a pressure member 150. The holes of the die are so shaped that when the teeth are forced thereinto lower parts of the teeth become rounded so that instead of each tooth having a straight taper with sharp edges 36', each tooth has a straight taper for the major length thereof which taper blends into a substantially cylindrical portion that extends nearly to point 36. In this reformation of the tooth, metal is flowed forwardly in zones $b$.

Referring to Fig. 15, it will be seen that when a cord 40 is drawn straight downwardly in contact with a dog having the teeth reformed by the die of Fig. 14, the cord rides on rounded portions $b$ and does not scrape against the points 36 of the teeth. With the conventional tooth form shown in Fig. 13, the cord scrapes not only on points 36, but also on the adjacent sharp edges 36'. Referring to Figs. 15 and 11, it will be seen that, by swinging the cord to the left, it can readily be caused to engage the points of the modified dog teeth, to lift the dog to locking position. When so engaged, the modified teeth engage the cord as effectively, or more so, than do conventional teeth. The point 36 of the modified tooth is just as sharp as before modification, and the modified tooth has a smaller cross sectional area just above the point.

From the foregoing it will be seen that the present invention provides a new, simple and efficient cord lock in which the pulley and locking dog rotate about the same axis, with attendant advantages, and in which the teeth of the dog are so shaped as to reduce wear on the cord during downward pull thereof in contact with the dog.

What I claim is:

1. A cord lock for blinds comprising a housing having substantially parallel side walls and having a locking surface, a partition member in said housing having walls spaced from said side walls, a pulley between the walls of said partition member, a cord locking dog having legs in the spaces between said partition walls and said side walls, and a member passing through said side walls, said legs of the dog, said partition walls and said pulley to retain such parts in assembly and to provide a common shaft about which said pulley and said dog may rotate for locking the cord against said locking surface.

2. A cord lock for blinds comprising a housing having substantially parallel side walls and having a locking surface, a partition member in said housing having walls spaced from said side walls, a pulley between the walls of said partition member, a cord locking dog having legs in the spaces between said partition walls and said side walls, and a member passing through said side walls, said legs of the dog, said partition walls and said pulley to retain such parts in assembly and to provide a common shaft about which said pulley and said dog may rotate, the dog being adapted to lock the cord against said locking surface, and said housing and said partition member having cooperating formations preventing relative movement therebetween.

3. A cord lock for blinds comprising a housing having substantially parallel side walls and having a locking surface, a partition member in said housing having walls spaced from said side walls, a pulley between the walls of said partition member, a cord locking dog having legs in the spaces between said partition walls and said side walls, and a member passing through said side walls, said legs of the dog, said partition walls and said pulley to retain such parts in assembly and to provide a common shaft about which said pulley and said dog may rotate, the dog being adapted to lock the cord against said locking surface, and said housing and said partition member having formations cooperating to prevent approach of the partition walls toward one another.

4. A cord lock for blinds comprising a housing having substantially parallel side walls and having a locking surface, a partition member in said housing having walls spaced from said side walls, a pulley between the walls of said partition member, a cord locking dog having legs in the spaces between said partition walls and said side walls, and a member passing through said side walls, said legs of the dog, said partition walls and said pulley to retain such parts in assembly and to provide a common shaft about which said pulley and said dog may rotate, the dog being adapted to lock the cord against said locking surface, and said partition walls having formations limiting movement thereof toward said side walls.

5. A cord lock for blinds comprising a housing having substantially parallel side walls and having a locking surface, a partition member in said housing having walls spaced from said side walls, a pulley between the walls of said partition member, a cord locking dog having legs in the spaces between said partition walls and said side walls, and a member passing through said side walls, said legs of the dog, said partition walls and said pulley to retain such parts in assembly and to provide a common shaft about which said pulley and said dog may rotate, the dog being adapted to lock the cord against said locking surface, and said partition member having a portion thereof serving as a stop to limit rotation of said dog in one direction.

6. A cord lock for blinds comprising a housing having a locking surface, a pulley over which cord may pass and a dog having cord-engaging formations to grip the cord and lock it against said surface, said formations being of generally saw tooth shape with the end portions rounded in cross section to reduce sharp cord-fraying edges.

7. A cord lock for blinds comprising a housing having a locking surface, a pulley over which cord may pass, and a dog having cord engaging formations to grip the cord and lock it against said surface, said formations being of generally saw tooth shape with edges tapered into substantially cylindrical portions.

8. A cord lock for blinds, comprising: a housing having two opposite side walls in spaced relation, an axle supported by said side walls and extending across the space between them, a cord pulley mounted on said axle and positioned between said side walls, said pulley being of substantially lesser thickness than the space between said side walls, a cord-locking surface on said housing in juxtaposition to a cord passing over said pulley, said cord-locking surface being stationary with respect to the remainder of the housing and facing the cord-bearing surface of the pulley in spaced relation thereto, a cord-engaging dog for locking the cord against said cord-locking surface, said dog being pivotally mounted on said axle between the pulley and the side walls and being movable into locking position by rotation about said axle, and means associated with said housing for confining said pulley to a central position in the space between said side walls and out of contact with the cord-engaged dog.

9. A cord lock for blinds, comprising: a housing having two opposite side walls in spaced relation, an axle supported by said side walls and extending across the space between them, a pulley mounted on said axle and positioned between said side walls, a cord-locking surface on said housing in juxtaposition to a cord passing over said pulley, said cord-locking surface being stationary with respect to the remainder of the housing and facing the cord-bearing surface of the pulley in spaced relation thereto, a cord-engaging dog for locking the cord against said cord-locking surface, said dog having portions extending on opposite sides of said pulley in closely spaced relation to the side walls of said housing, said portions being pierced by said axle and thereby pivotally supporting the dog from said axle, said dog being movable into locking position by rotation about said axle, and means associated with said housing for maintaining the pulley out of contact with said dog portions.

10. In a metal locking dog for cord locks, the dog being of the type having triangular teeth the bases of which are attached to a body portion with the apices projecting from the body portion for engagement with a cord; the improvement which comprises the metal adjacent to the apices being displaced inwardly from the sides of their respective triangles and formed into tip portions of rounded cross section.

11. In a metal locking dog for cord locks, the dog being of the type having triangular teeth the bases of which are attached to a body portion with the apices projecting from the body portion for engagement with a cord, and each tooth having a forwardly-facing plane surface extending from its base toward its apex; the improvement which comprises the metal adjacent to the apices being displaced inwardly from the sides of their respective triangles and also being displaced rearwardly from said plane surface.

12. In a metal locking dog for cord locks, the dog being of the type having triangular teeth the bases of which are attached to a body portion with the apices projecting from the body portion for engagement with a cord, and each tooth having a forwardly-facing plane surface extending from its base toward its apex; the improvement which comprises the metal adjacent to the apices being displaced rearwardly from said plane surface.

13. A cord lock for blinds, comprising: a U-shaped housing adapted to receive the lift cords of a blind and having two opposite generally parallel side walls in spaced relation and a connecting end wall, the end wall being provided with a cord-locking surface, a cord pulley mounted for rotation between and in a plane parallel to the side walls, and a cord-engaging dog pivotally mounted within the housing for locking the lift cords against the cord locking surface of the end wall, the axes of rotation of the pulley and cord-engaging dog being located above the lower edge of the housing end wall, and the lower edges of the end wall of the housing and the adjacent portions of the side walls being coterminous and the end wall and each side wall being provided with an inwardly-pressed rib portion immediately above and substantially parallel to its lower edge to provide smooth bearing means for the lift cords of the blind and to aid in maintaining the lift cords centered within the housing.

14. A cord lock for blinds, comprising: a housing adapted to receive the lift cords of a blind and having two opposite generally parallel side walls in spaced relation and a connecting end wall, the end wall being provided with a cord-locking surface, a cord pulley mounted for rotation between and in a plane parallel to the side walls, and a cord-engaging dog movably mounted within the housing for locking the lift cords against the cord-locking surface of the end wall, the lower portions of the side walls being coterminous with the lower portion of the end wall, the axes of rotation of the pulley and cord-engaging dog being located above the lower edge of the housing end wall, and the cord-receiving portion of the housing being provided near its bottom with smooth, rounded cord-bearing means formed by alined rib portions pressed inwardly in said side walls and end wall somewhat above their lower edges.

15. A cord lock for blinds, comprising: a unitary housing adapted to receive the lift cords of a blind and having two opposite generally parallel side walls in spaced relation and a connecting end wall, the end wall being provided with a cord-locking surface, a cord pulley mounted for rotation between and in a plane parallel to the side walls, and a cord-engaging dog oscillatably mounted within the housing on the axis of the pulley for locking the lift cords against the cord-locking surface of the end wall, the side walls and end wall of the cord-receiving portion of the housing being provided below the pulley with a smooth, rounded, functionally-continuous cord-bearing surface formed by rib portions pressed inwardly in each of said housing walls.

16. A cord lock for blinds, comprising: a U-shaped housing having two opposite side walls in generally parallel spaced relation and a connecting, generally vertical end wall, an axle supported by said side walls and extending across the space between them, a cord pulley freely rotatable on said axle and positioned between said side walls, there being a space between the pulley and the end wall for the passage of lift cords therebetween, a cord locking surface formed from a portion of said end wall in juxtaposition to cords passing over said pulley, the cord-locking surface being inclined towards the pulley from an adjacent portion of the end wall, and a cord-engaging dog for locking the cords against the cord-locking surface, the dog being pivotally mounted on said axle and being rotatable into cord-locking position by the lift cords.

17. A cord lock for blinds, comprising: a U-shaped housing having two opposite side walls in generally parallel spaced relation and a connecting, generally vertical end wall, an axle supported by said side walls and extending across the space between them, a cord pulley freely rotatable on said axle and positioned between said side walls, there being a space between the pulley and the end wall for the passage of lift cords therebetween, a cord-locking surface formed from a portion of said end wall in juxtaposition to cords passing over said pulley, the cord-locking surface being generally planar and inclined towards the pulley from an adjacent portion of the end wall, and a cord-engaging dog for locking the cords against the cord-locking surface, the dog being pivotally mounted on said axle and being rotatable into cord-locking position by the lift cords.

HARRY H. NELSON.

REFERENCES CITED

The following references are of record in the file of this patent:

UNITED STATES PATENTS

| Number | Name | Date |
| --- | --- | --- |
| 948,094 | Humphrey | Feb. 1, 1910 |
| 1,804,811 | Rosel | May 12, 1931 |
| 1,865,935 | Marshall et al. | July 5, 1932 |
| 2,075,214 | Lorentzen | Mar. 30, 1937 |
| 2,115,796 | Bradfield, Jr. | May 3, 1938 |

FOREIGN PATENTS

| Number | Country | Date |
| --- | --- | --- |
| 393,645 | France | Oct. 31, 1908 |